(12) United States Patent  
Kim

(10) Patent No.: US 12,549,553 B2
(45) Date of Patent: Feb. 10, 2026

(54) CONTROLLER-BASED SYSTEM FOR CONTROLLING NETWORK ACCESS, AND METHOD THEREFOR

(71) Applicant: PRIBIT Technology, Inc., Seoul (KR)

(72) Inventor: Young Rang Kim, Seoul (KR)

(73) Assignee: PRIBIT Technology, Inc., Seoul (KR)

( * ) Notice: Subject to any disclaimer, the term of this patent is extended or adjusted under 35 U.S.C. 154(b) by 121 days.

(21) Appl. No.: 18/710,151

(22) PCT Filed: Nov. 10, 2022

(86) PCT No.: PCT/KR2022/017605
§ 371 (c)(1),
(2) Date: May 14, 2024

(87) PCT Pub. No.: WO2023/085791
PCT Pub. Date: May 19, 2023

(65) Prior Publication Data
US 2025/0030692 A1    Jan. 23, 2025

(30) Foreign Application Priority Data

Nov. 15, 2021 (KR) .......................... 10-2021-0156540

(51) Int. Cl.
*H04L 45/586* (2022.01)
*H04L 9/40* (2022.01)
(52) U.S. Cl.
CPC ........ *H04L 63/101* (2013.01); *H04L 63/0236* (2013.01); *H04L 63/083* (2013.01)

(58) Field of Classification Search
CPC ............... H04L 63/101; H04L 63/0236; H04L 63/083; H04L 9/40; H04L 45/586; H04L 47/2475
See application file for complete search history.

(56) References Cited

U.S. PATENT DOCUMENTS

2016/0232078 A1* 8/2016 Biswas ............... G06F 11/3692
2016/0337937 A1* 11/2016 McCann ................. H04L 45/42
(Continued)

FOREIGN PATENT DOCUMENTS

KR   10-2016-0041631 A   4/2016
KR   10-2018-0087561 A   8/2018
(Continued)

*Primary Examiner* — Amie C. Lin
(74) *Attorney, Agent, or Firm* — Seed Intellectual Property Law Group LLP

(57) ABSTRACT

A node according to an embodiment disclosed in the present document may store instructions for: performing a network access request to an external server through an access control application, the network access request including identification information of a target application and identification information of a destination network; receiving a data flow from the external server through the access control application, the data flow corresponding to identification information of the node and the identification information of the destination network and including information about whether a data packet can be transmitted through a virtual router; and transmitting a data packet of the target application on the basis of the received data flow, through the access control application. The virtual router may be included in a switch to which the node transmits the data packet.

20 Claims, 14 Drawing Sheets

(56) References Cited

U.S. PATENT DOCUMENTS

| | | |
|---|---|---|
| 2017/0156106 A1 | 6/2017 | Chen et al. |
| 2018/0026987 A1* | 1/2018 | Jayawardena ...... H04L 63/0892 |
| | | 726/7 |
| 2018/0034737 A1* | 2/2018 | Wackerly ............ H04L 47/2458 |
| 2020/0112474 A1 | 4/2020 | Seong et al. |
| 2021/0091976 A1 | 3/2021 | Kim et al. |
| 2021/0092094 A1 | 3/2021 | Kim et al. |
| 2021/0092095 A1 | 3/2021 | Kim et al. |
| 2021/0328830 A1 | 10/2021 | Kim et al. |
| 2022/0247718 A1 | 8/2022 | Kim et al. |
| 2022/0247719 A1 | 8/2022 | Kim et al. |
| 2022/0247720 A1 | 8/2022 | Kim et al. |
| 2022/0247721 A1 | 8/2022 | Kim et al. |
| 2022/0247748 A1 | 8/2022 | Kim |
| 2022/0255906 A1 | 8/2022 | Kim et al. |
| 2022/0337604 A1 | 10/2022 | Kim et al. |

FOREIGN PATENT DOCUMENTS

| | | |
|---|---|---|
| KR | 10-2018-0087889 A | 8/2018 |
| KR | 10-2036725 B1 | 10/2019 |
| KR | 10-2021-0045917 A | 4/2021 |
| KR | 10-2407136 B1 | 6/2022 |

\* cited by examiner

CONTROLLER-BASED SYSTEM FOR CONTROLLING NETWORK ACCESS, AND METHOD THEREFOR

CROSS-REFERENCE TO RELATED APPLICATION(S)

The present disclosure claims the benefit of Korean Patent Application No. 10-2021-0156540 filed on Nov. 15, 2021 with the Korean Intellectual Property Office, the disclosure of which is incorporated herein by reference in its entirety.

BACKGROUND

Technical Field

Embodiments of the present disclosure relate to a system for controlling a network access based on a controller and a method thereof.

Description of the Related Art

A plurality of devices may communicate data over a network. For example, a smartphone may transmit or receive data to or from a server over the Internet. The network may include a private network such as an intranet as well as a public network such as the Internet.

In the case of a large-scale network or software defined data center (SDDC) which general terminals access, a network may be implemented based on a software defined network (SDN) which has advantages such as securing of a network bandwidth, expandability, and easy management.

When the software defined network is implemented, each node on a transcription network may be connected to an SDN switch (spine switch, leaf switch), and the network may be controlled by a SDN controller, that is, by a physical port, a virtual LAN (VLAN), and a virtual router (VR), a function and a technology such as a virtualized network function (VNF), and the like included in the SDN switch.

BRIEF SUMMARY

Technical Problem

When a minimal software defined network is implemented by using an SDN controller and an SDN switch, a transcription network control based on an advanced network control technology, which is not provided by an SDN switch, through a virtualized network function (VNF) or network function virtualization (NFV)-based technology, that is, a data flow-based network control may be impossible.

In the software defined network, various types of network segmentation may occur depending on types and purposes of nodes, for example, general network bands and ports (e.g., a target not requiring a control for a target network, as networks and ports to which nodes not requiring management are connected), network bands and ports requiring management (e.g., a target at which only a node where a network access control application is installed is capable of accessing a target network), and the like, and a network access control should be performed for each network segmentation.

Various embodiments of the present disclosure provide a system for addressing the above-mentioned problems in a network environment and a method thereof.

Technical Solution

A node according to an embodiment of the present disclosure may include a communication circuit, a processor that is operatively connected to the communication circuit, and a memory that is operatively connected to the processor, and configured to store an access control application and a target application. The memory may store instructions, when executed by the processor, causing the node to perform a network access request to an external server through the access control application, the network access request including identification information of the target application and identification information of a destination network, to receive a data flow from the external server through the access control application, the data flow corresponding to the network access request and the data flow includes information about whether a data packet is capable of being transmitted through a virtual router, and to transmit a data packet of the target application based on the received data flow, through the access control application, and the virtual router may be included in a software defined network (SDN) switch through which the node transmits the data packet.

A server according to an embodiment of the present disclosure may include a communication circuit, a memory that stores a database, and a processor that is operatively connected to the communication circuit and the memory. The processor may receive a network access request from an access control application of a node, the network access request including control flow identification information, identification information of a target application of the node, and identification information and port information of a destination network, may identify whether an access of the target application is possible, based on the identification information of the target application, the identification information of the destination network, and the port information, may identify whether a data packet of the target application is capable of being transmitted to the destination network through a virtual router when the access of the target application is possible, generate a data flow, may update the data flow, the virtual router being included in an SDN switch between the node and the destination network, and may transmit the updated data flow to the node and an SDN controller connected to the SDN switch.

An operating method of an access control application installed in a node, according to an embodiment of the present disclosure, may include performing a network access request to an external server through the access control application, the network access request including identification information of a target application and identification information of a destination network, receiving a data flow from the external server through the access control application; the data flow corresponding to identification information of the node and the identification information of the destination network and the data flow including information about whether a data packet is capable of being transmitted through a virtual router, and transmitting a data packet of the target application based on the received data flow, through the access control application, and the virtual router may be included in an SDN switch through which the node transmits the data packet.

Advantageous Effects

According to embodiments of the present disclosure, data packet transmission of an unauthorized application may be blocked even in an SDN network environment through an access control application for a data flow-based access control in an SDN network which does not generate tunneling or security sessions.

Also, according to embodiments of the present disclosure, a data flow-based network control may be performed even when a minimal software defined network is implemented only by using an SDN controller and an SDN switch.

In addition, according to embodiments of the present disclosure, a detailed network access control may be performed through a network access control application installed on each node connected to a network band requiring management in various types of network segments, and simultaneously, the execution of a network access control application and the access to a network where an unauthorized node is not allowed may be blocked through a virtual router included in an SDN switch. Accordingly, even when a minimal software-defined network is implemented, a network control may be possible without using any other advanced network control technology.

Furthermore, according to embodiments of the present disclosure, there may be blocked unauthorized and abnormal accesses of various new risks (e.g., ransomware, malware, and the like) which arise in situations where it is impossible to track an application being an actual network access target due to the limitation of IP identification information inherent in the Internet protocol (IP) technology. Accordingly, an effective network access control method may be provided on a transcription network.

Besides, according to embodiments of the present disclosure, a network access may be controlled based on a virtual router of an SDN switch by setting source and destination routing bands together with identification information, such as an MAC address and an IP address, at Layer 2 or Level 3. Accordingly, a detailed network access control may be possible by using identification information such as a MAC address and an IP address which are minimum identification units of a node.

In addition, various effects ascertained directly or indirectly through the present disclosure may be provided.

DETAILED DESCRIPTION

Figure 1:
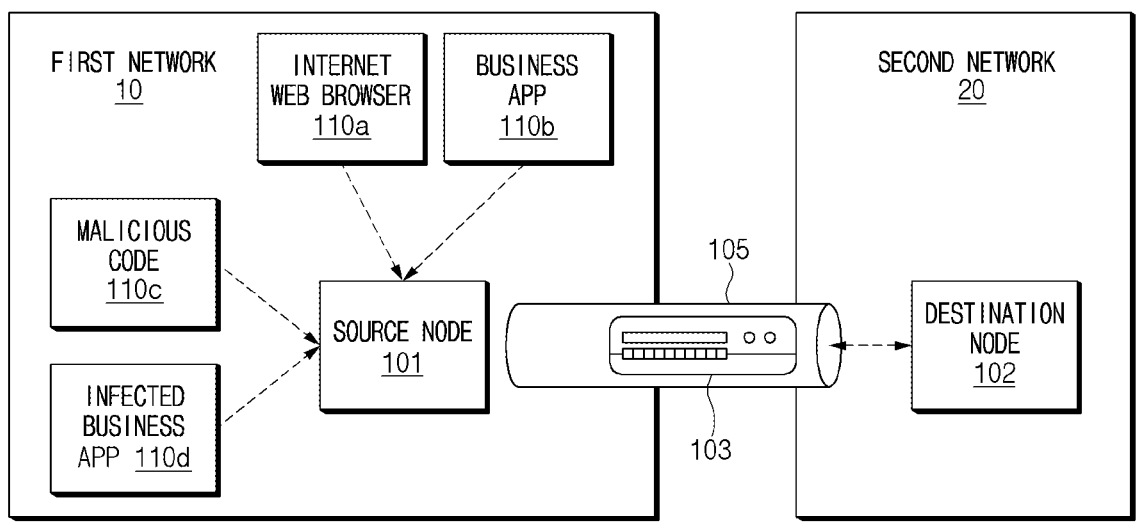
FIG. 1 illustrates an environment including a plurality of networks.

Hereinafter, various embodiments of the disclosure will be described with reference to accompanying drawings. However, it should be understood that this is not intended to limit the present disclosure to specific implementation forms and includes various modifications, equivalents, and/or alternatives of embodiments of the present disclosure.

In the specification, the singular form of the noun corresponding to an item may include one or more of items, unless interpreted otherwise in context. In the specification, each of phrases such as "A or B", "at least one of A and B", "at least one of A or B", "A, B, or C", "at least one of A, B, and C", and "at least one of A, B, or C" may include any one of items listed together with a relevant phase among the phases or all possible combinations thereof. The terms, such as "first" or "second" may be used to simply distinguish the corresponding component from the other component, but do not limit the corresponding components in other aspects (e.g., importance or order). When a component (e.g., a first component) is referred to as being "coupled to" or "connected to" another component (e.g., a second component) with or without the term of "operatively" or "communicatively", it may mean that the first component is capable of being connected to the second component, directly (e.g., by wire), wirelessly, or through a third component.

Each component (e.g., a module or a program) of components described in the specification may include a single entity or a plurality of entities. According to various embodiments, one or more components of corresponding components or operations may be omitted, or one or more other components or operations may be added. Alternatively or additionally, a plurality of components (e.g., a module or a program) may be integrated into one component. In this case, the integrated component may perform one or more functions of each component of the plurality of components to be the same as or similar to those performed by the corresponding component of the plurality of components before the plurality of components are integrated. According to various embodiments, operations which are performed by modules, programs, or other components may be performed by a sequential, parallel, repeated, or heuristic method; alternatively, one or more of the operations may be performed in another order or may be omitted, or one or more operations may be added thereto.

As used in the present disclosure, the term "module" may include a unit implemented in hardware, software, or firmware and may be interchangeably used, for example, with terms such as "logic", "logic block", "part", or "circuit". The module may be a minimum unit of an integrated part or may be a minimum unit of the part for performing one or more functions or a part thereof. For example, according to an embodiment, the module may be implemented in the form of an application-specific integrated circuit (ASIC).

Various embodiments of the present disclosure may be implemented as software (e.g., a program or an application)

including one or more instructions stored in a storage medium (e.g., a memory) readable by a machine. For example, a processor of the machine may call at least one instruction among the stored one or more instructions from the storage medium and then may execute the at least one instruction. This enables the machine to operate such that at least one function is executed depending on the called at least one instruction. The one or more instructions may include a code generated by a complier or a code executable by an interpreter. The machine-readable storage medium may be provided in the form of a non-transitory storage medium. Herein, the "non-transitory" only means that the storage medium is a tangible device and does not include a signal (e.g., an electromagnetic wave), and this term does not distinguish the case where data are semipermanently stored in the storage medium from the case where the data are stored temporarily.

A method according to various embodiments disclosed in the specification may be provided to be included in a computer program product. The computer program product may be traded between a seller and a buyer as a product. The computer program product may be distributed in the form of a machine-readable storage medium (e.g., a compact disc read only memory (CD-ROM)) or may be distributed (e.g., downloaded or uploaded), through an application store, directly between two user devices, or online. If distributed online, at least a part of the computer program product may be temporarily generated or may be at least temporarily stored in the machine-readable storage medium such as a memory of the manufacturer's server, a server of the application store, or a relay server.

FIG. 1 illustrates an environment including a plurality of networks.

Referring to FIG. 1, a first network 10 and a second network 20 may be different networks. For example, the first network 10 may be a public network such as the Internet, and the second network 20 may be a private network such as an intranet or a VPN.

The first network 10 may include a source node 101. In FIG. 1 and embodiments to be described below, the "source node" may be various types of devices capable of performing data communication. For example, the source node 101 may include a portable device such as a smartphone and a tablet, a computer device such as a desktop or a laptop, a multimedia device, a medical device, a camera, a wearable device, a virtual reality (VR) device, or a home appliance but are not limited to the above devices. For example, the source node 101 may include a server or a gateway capable of transmitting a data packet through an application. The source node 101 may be also referred to as an "electronic device" or a "terminal". Meanwhile, a destination node 102 may include a device which is the same as or similar to that of the source node 101 described above. For another example, the destination node 102 may be substantially the same as a destination network.

The source node 101 may attempt to access the second network 20 and may transmit data to the destination node 102 included in the second network 20. The source node 101 may transmit data to the destination node 102 through an SDN switch 103 and a virtual routing 105.

When the access of the source node 101 to the first network 10 is granted, the source node 101 may be able to communicate with all servers included in the first network 10; in this case, the source node 101 may be exposed to an attack of a malicious program. For example, the source node 101 may receive a malicious code 110c or data of an untrusted or insecure application such as an infected business application 110d, as well as an Internet web browser 110a and a trusted and/or secure application such as a business application 110b.

The source node 101 infected from the malicious program may attempt to access the second network 20 and/or to transmit data to the second network 20. When the second network 20 is established based on an IP like the VPN, it may be difficult for the second network 20 to individually monitor a plurality of devices included in the second network 20, and the second network 20 may be vulnerable to security of an application layer or a transport layer in an OSI layer. Also, when the source node 101 includes a malicious application after the channel is already generated, data of the malicious application may be transmitted to any other electronic device (e.g., the destination node 102) in the second network 20.

Figure 2:
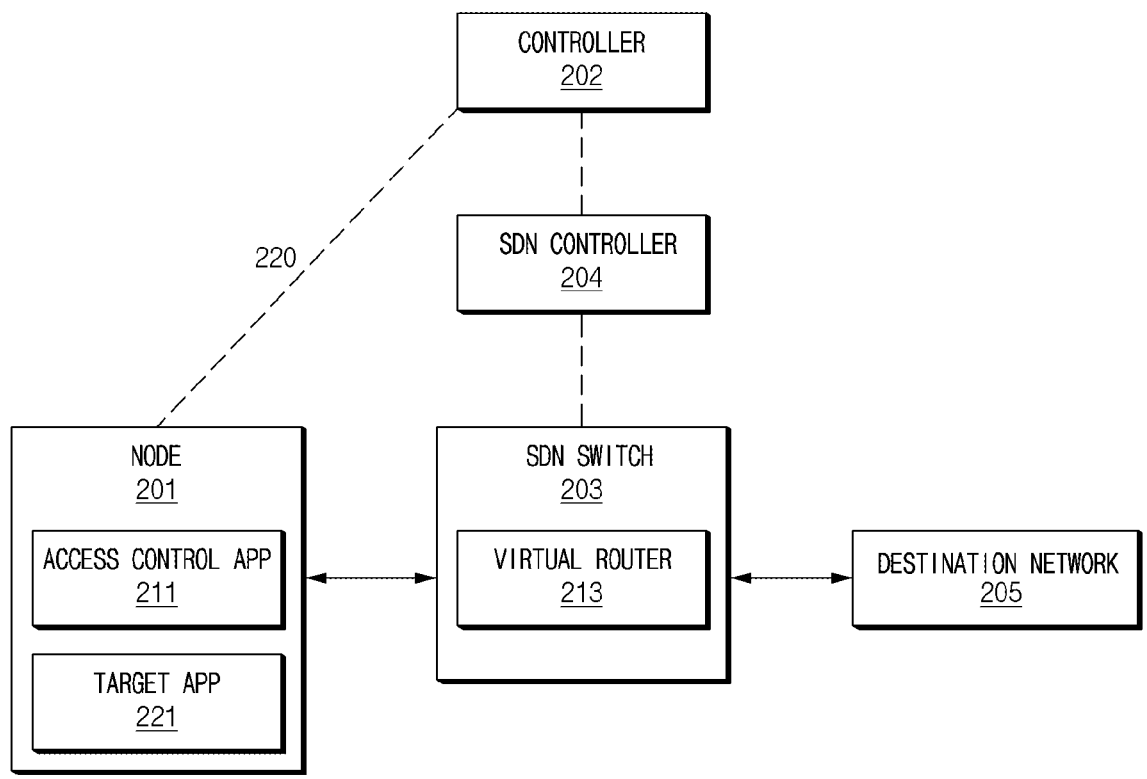
FIG. 2 illustrates an architecture in a network environment, according to various embodiments.

FIG. 2 illustrates an architecture in a network environment according to various embodiments.

Referring to FIG. 2, the number of nodes 201, the number of SDN switches 203, and the number of SDN controllers 204 are not limited to examples illustrated in FIG. 2. For example, the network access of a plurality of nodes may be controlled from a controller 202, the controller 202 may communicate with a plurality of SDN controllers, and the SDN controller 204 may control a plurality of SDN switches. Also, an SDN switch 203 may include a plurality of virtual routers.

A node 201 may include an access control application 211 and a target application 221. For example, when a network access is generated, the access control application 211 may identify whether the access is possible from the controller 202; only when the access is possible, the access control application 211 may transmit a data packet to a destination network 205 through a virtual router 213 included in the SDN switch 203 based on a data flow generated by the controller 202. A data flow-based accessibility control technology may provide a structure in which communication is possible only when there exists a data flow authorized by the controller 202 for the node 201 to access the destination network 205 and may provide a structure in which the node 201 is incapable of communicating only when a data flow does not exist. For example, when a data flow does not exist, the access control application 211 may limit data packet transmission of the target application 221.

The controller 202 may be a server (or a cloud server). The controller 202 may control the network access of the node 201 to the destination network 205.

According to an embodiment, the controller 202 may transmit/receive control data packets to/from the node 201 to perform various operations (e.g., registration, approval, authentication, update, and termination) associated with the network access of the node 201. A flow 220 through which a control data packet is transmitted may be referred to as a "control flow".

An environment in which the controller 202 is capable of blocking the access of an unapproved node to the destination network 205 may be provided through the above operations.

The controller 202 may perform communication with the SDN controller 204 in association with a routing table or the like and may obtain a list of nodes connected to a plurality f SDN switches which the SDN controller 204 controls.

The SDN switch 203 may control the virtual router 213 based on the routing table. For example, the SDN switch 203 may determine whether to route a data packet received from the node 201 through the virtual router 213 or whether to drop the data packet.

Figure 3:
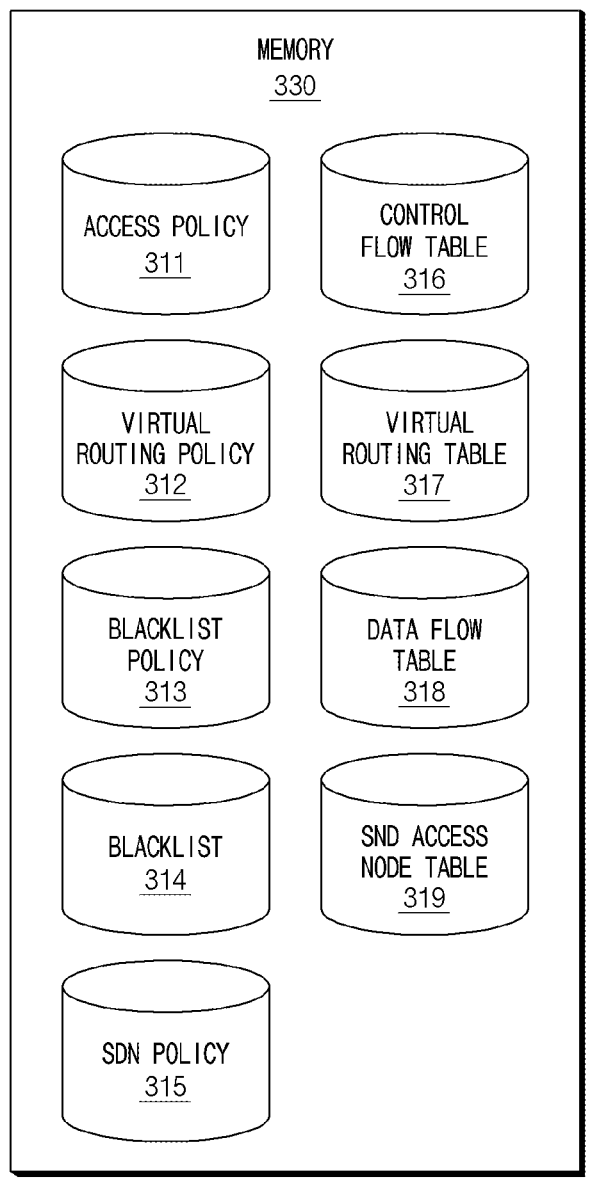
FIG. 3 is a functional block diagram illustrating a database stored in a controller, according to various embodiments.

FIG. 3 is a functional block diagram illustrating a database stored in a controller, according to various embodiments. FIG. 3 shows only a memory 330. However, a controller may further include a communication circuit (e.g., a communication circuit 430 of FIG. 4) for performing communication with an external electronic device and a processor (e.g., a processor 410 of FIG. 4) for controlling all the operations of the controller.

Because an administrator is able to connect to the controller 202 and to set an access-oriented policy for controlling the access between a source and a destination, compared to existing network access control (NAC) and firewall, a precise network access control is possible.

An access policy database 311 may include information about a network and/or a service accessible by an identified network, a node (e.g., the node 201 of FIG. 2), a user, a non-identification user, or an application. For example, when the access to a destination network is requested from the node, the controller may determine whether the identified network (e.g., a network to which the node belongs), the node, the user (e.g., a user of the node), and/or the application (e.g., an application included in the node) is capable of accessing the destination network, based on the access policy database 311.

A virtual routing policy database 312 may include information of a routing band or the like to be permitted depending on a routing band and an access policy (e.g., information included in the access policy database 311) which the node will basically permit at a virtual NIC or a virtual router (e.g., the virtual router 213 of FIG. 2) present at a target network boundary on an access path depending on the access policy. For example, when the network access request of the node exists, the controller may provide an optimal network path for accessing a target network or the destination network based on the virtual routing policy database 312.

A blacklist policy database 313 may include a policy for permanently or temporarily blocking the access of the node. The blacklist policy database 313 may be generated based on information (e.g., at least one of a node, an IP address, a media access control (MAC) address, or a user ID) identified through a risk level, an occurrence period, and/or a behavioral analysis of a security event among security events periodically collected from the node or the SDN switch.

The blacklist database 314 may include a list of at least one of a node, an IP address, a MAC address, or a user blocked by the blacklist policy database 313. For example, when the node requesting the access to the destination network is included in the blacklist database 314, the controller may isolate the node from the destination network by denying the access request of the node.

An SDN policy database 315 may control information of a virtual router included in an SDN switch and may control an SDN controller controlling a software defined network to identify nodes connected to the SDN switch. For example, the SDN policy database 315 may include a node isolation policy or the like depending on an API access of the SDN controller, authentication information, a series of network policy information for identifying a node, an identification information assigning method, various kinds of risks in a node access control, and an exception situation. The controller 202 removes a method capable of immediately removing, from a network, a node where a risk is detected based on the SDN policy database 315.

A control flow table 316 is provided as an example of a session table for managing a flow (e.g., a control flow) of a control data packet generated between the node and the controller. When the access to the controller is successfully made, control flow information may be generated by the controller. The control flow information may include at least one of identification information of the control flow, an IP address identified when the access and authentication associated with the controller is performed, a node ID, or a user ID. For example, when the access to the destination network is requested from the node, the controller may search for control flow information through the control flow identification information received from the node and may determine whether the access of the node is possible, whether a data flow is generated, and whether to update a routing table (e.g., a virtual routing table 317), by mapping at least one of an IP address, a node ID, or a user ID included in the found control flow information to the access policy database 311.

According to an embodiment, the control flow may have an expiration time. The node should update the expiration time of the control flow, and when the expiration time is not updated during a given time, the control flow (or control flow information) and the routing table (e.g., the virtual routing table 317) may be removed. Also, when it is determined that there is a need to immediately block the access depending on the security event collected from the node, the controller may remove the control flow depending on an access termination request of the node. When the control flow is removed, the previously generated data flow and routing table may be also removed, and thus, the access of the node may be blocked.

The virtual routing table 317 is an example of a table for managing a communication path (or routing) between the node and the destination network. The virtual routing table 317 may include a band of a source network, a band of a destination network, router address information, and the like of the node to set routing information of a virtual router present in an SDN switch. For example, the routing information may be set for each node or may be set in units of software defined boundary network segment (SDN segment), and may provide a method for controlling the network access in units of NIC, MAC address, or IP address. In an embodiment, the routing information included in the virtual routing table 317 may include information about whether a data packet of the node is capable of transmitting a data packet through the corresponding virtual router.

A data flow table 318 refers to a table for managing a flow (e.g., a data flow) through which a detailed data packet is transmitted between the node, the virtual router, and the destination network. The data flow may be generated in units of TCP session generated in units of node or IP, in units of application of a node, or in a more detailed unit. The data flow table 318 may include data flow identification information, control flow identification information when the data flow is dependent on the control flow, an application ID for identifying whether a data packet transmitted from the node is an authorized data packet, source network identification information, destination network identification information, and/or a service port. Also, the data flow table 318 may include a routing ID on the virtual routing table 317, which is for providing a path (or routing) accessible to the virtual router based on the data flow.

An SDN access node table 319 may include a series of information (e.g., a MAC address, an IP address, an SDN switch ID which an SDN controller manages, network segment identification information, and the like) for identifying a node connected to an SDN switch and information of a state (e.g., Up, Down, or the like) of an identified node.

In an embodiment, the data flow table 318 may be identically stored in the node.

Figure 4:
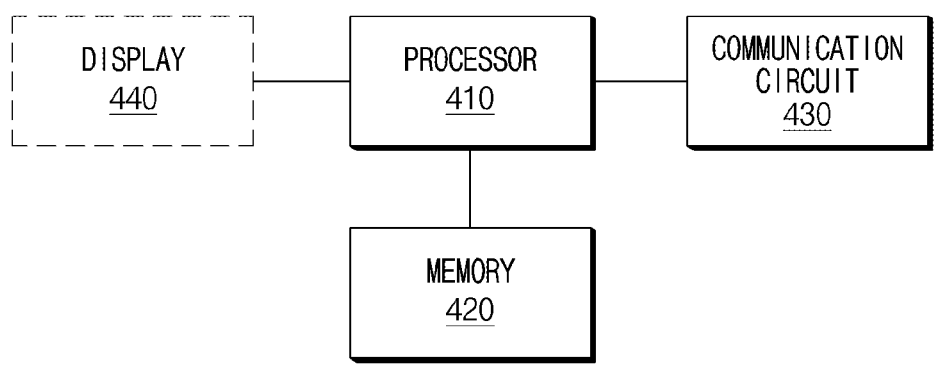
FIG. 4 is a functional block diagram of a node, according to various embodiments.

Referring to FIG. 4, the node may include the processor 410, a memory 420, and the communication circuit 430. According to an embodiment, the node may further include a display 440 to perform an interface with the user.

The processor 410 may control all the operations of the node. In various embodiments, the processor 410 may include a single processor core or may include a plurality of processor cores. For example, the processor 410 may include a multi-core such as a dual-core, a quad-core, a hexa-core, or the like. According to embodiments, the processor 410 may further include a cache memory located at the inside or outside thereof. According to embodiments, the processor 410 may be configured with one or more processors. For example, the processor 410 may include at least one of an application processor, a communication processor, or a graphical processing unit (GPU).

Part or all of the processor 410 may be electrically or operatively coupled with or connected to any other component (e.g., the memory 420, the communication circuit 430, or the display 440) in the node. The processor 410 may receive commands of any other components of the node, may interpret the received commands, and may perform calculation or data processing depending on the interpreted commands. The processor 410 may interpret and process a message, data, an instruction, or a signal received from the memory 420, the communication circuit 430, or the display 440. The processor 410 may generate a new message, data, instruction, or signal based on the received message, data, instruction, or signal. The processor 410 may provide the processed or generated message, data, instruction, or signal to the memory 420, the communication circuit 430, or the display 440.

The processor 410 may process data or a signal which is generated or caused by a program. For example, the processor 410 may request an instruction, data, or a signal from the memory 420 to execute or control the program. The processor 410 may record (or store) or update an instruction, data, or a signal at the memory 420 to execute or control the program.

The memory 420 may store an instruction to control the node, a control instruction code, control data, or user data. For example, the memory 420 may include at least one of an application program, an operating system (OS), middleware, or a device driver.

The memory 420 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like.

The memory 420 may further include a non-volatile medium such as a hard disk drive (HDD), a solid state disk (SSD), an embedded multimedia card (eMMC), or universal flash storage (UFS).

According to an embodiment, the memory 420 may store a portion of information included in a memory (e.g., the memory 330 of FIG. 3) of the controller. For example, the memory 420 may store the data flow table 318 described in FIG. 3.

The communication circuit 430 may establish a wired or wireless communication connection between the node and an external electronic device (e.g., the controller 202 or the SDN switch 203 of FIG. 2) and may support to perform communication through the established communication connection. According to an embodiment, the communication circuit 430 may include a wireless communication circuit (e.g., a cellular communication circuit, a short-range wireless communication circuit, or a global navigation satellite system (GNSS) communication circuit) or a wired communication circuit (e.g., a local area network (LAN) communication circuit or a power line communication circuit) and may communicate with the external electronic device by using a corresponding communication circuit among them through the short-range communication network such as a Bluetooth, a Wi-Fi direct, or an infrared data association (IrDA)) or the long-distance communication network such as a cellular network, an Internet, or a computer network. Various kinds of communication circuits 430 described above may be implemented with one chip or may be respectively implemented with separate chips.

The display 440 may output content, data, or a signal. In various embodiments, the display 440 may display image data processed by the processor 410. According to embodiments, the display 440 may be coupled with a plurality of touch sensors (not illustrated) capable of receiving a touch input or the like so as to be configured with an integrated touch screen. When the display 440 is configured with the touch screen, the plurality of touch sensors may be disposed over the display 440 or may be disposed under the display 440.

Meanwhile, a server (e.g., a controller) according to an embodiment may include the processor 410, the memory 420, and the communication circuit 430. The processor 410, the memory 420, and the communication circuit 430 included in the server may be substantially the same as the processor 410, the memory 420, and the communication circuit 430 which are described above.

Figure 5:
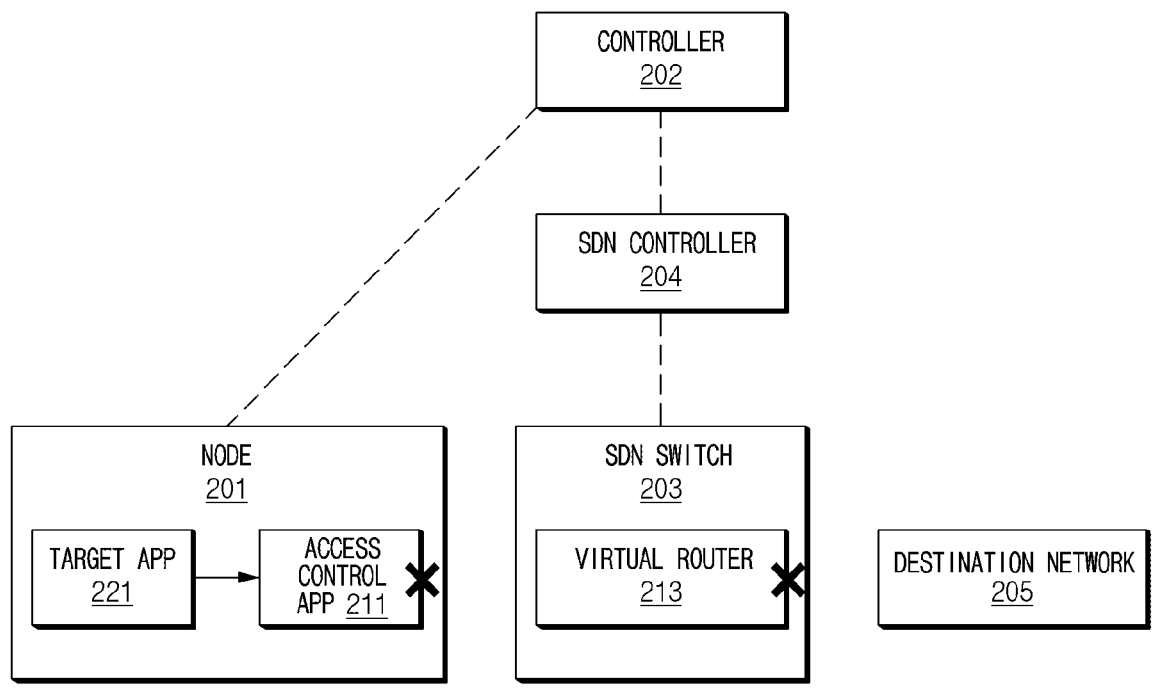
FIG. 5 is a diagram illustrating an operation of controlling transmission of a data packet, according to various embodiments.

FIG. 5 is a diagram illustrating an operation of controlling transmission of a data packet, according to various embodiments.

Referring to FIG. 5, after the node 201 connects to the controller 202, the node 201 may block an unapproved data packet, in which a data flow does not exist, from among data packets to be transmitted to the destination network 205, at a network driver stage and a kernel stage of an operating system. Accordingly, the node 201 may not transmit any data packet not passing through the access control application 211 to the destination network 205.

Also, when the access control application 211 of the node 201 is not under execution or is in an access-terminated state, a virtual routing table (e.g., the virtual routing table 317 of FIG. 3) on the virtual router 213 may be retrieved, and thus, the node 201 may provide an access-impossible state to the destination network 205. Accordingly, a method capable of perfectly isolating the network access to the destination network 205 depending on a state of the node 201 may be provided through the controller 202 and the virtual router 213.

Figure 6:
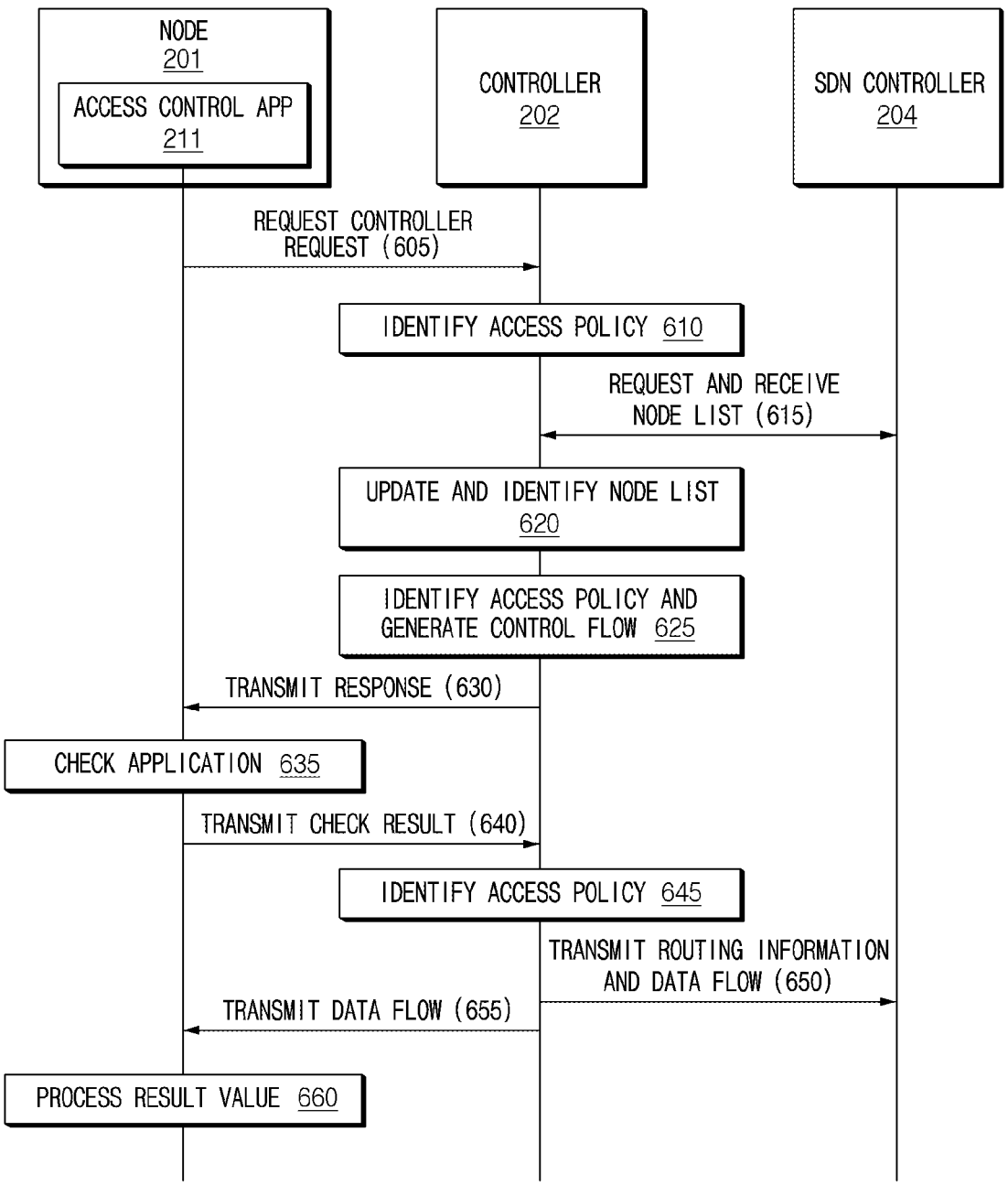
FIG. 6 illustrates a signal flow diagram for a controller access of a node, according to various embodiments.

FIG. 6 illustrates a signal flow diagram for a controller access of a node, according to various embodiments.

Because the node 201 need be authorized by the controller 202 to access or receive a network, the access control application 211 of the node 201 may request the controller 202 to generate a control flow such that the controller access of the node 201 is attempted.

Referring to FIG. 6, in operation 605, the access control application 211 of the node 201 may request a controller access from the controller 202. For example, the access control application 211 may perform a controller access request with the controller 202 to generate a control flow. For example, the controller access request may include information about the node 201 or the access control application 211.

In operation 610, the controller 2020 may identify whether the access is possible by an access policy, based on information about the access request of the access control application 211. For example, the information about the access request of the access control application 211 may include a kind of the node 201, location information, an environment, a network in which the node 201 is included, and information about the access control application 211.

The controller 202 may identify whether the identified node 201 is present in an SDN access node table (e.g., the SDN access node table 319 of FIG. 2), based on the information of the identified node 201. According to an embodiment, when the identified node 201 is present in the SDN access node table, the controller 202 may perform operation 625 without performing operation 615 and operation 620. According to another embodiment, when the identified node 201 is absent from the SDN access node table, the controller 202 may perform operation 615.

In an embodiment, when a network in which the identified node 201 or the node 201 is included in a blacklist (e.g., the blacklist database 314 of FIG. 3), the controller 202 may transmit access-impossible information to the access control application 211 (operation 630).

In operation 615, the controller 202 may request a node list from the SDN controller 204. The SDN controller 204 may transmit a list of nodes currently connected to an SDN switch to the controller 202.

In operation 620, the controller 202 may update an existing SDN access node table based on the received node list. Also, the controller 202 may identify whether the identified node 201 is present in the received node list.

When the identified node 201 is absent from the received node list, in operation 625, the controller 202 may identify whether to limit the use of the identified node 201 based on the access policy and may transmit an identification result and access-impossible information to the access control application 211 (operation 630).

When the identified node 201 is included in the existing SDN access node table or the received node list, the controller 202 may generate a control flow between the access control application 211 or the node 201 and the controller 202. In this case, the controller 202 may generate control flow identification information in the form of a random number and may store identification information of the node 201 and/or a network to which the node 201 belongs in a control flow table (e.g., the control flow table 316 of FIG. 3). The information (e.g., the control flow identification information and/or the control flow information) stored in the control flow table may be used to authenticate the user of the node 201, to update information of the node 201, to identify a policy for the network access of the node 201, and/or to check validity. In an embodiment, the controller 202 may generate whitelist information of applications accessible in the access policy matched with the node 201.

When the control flow is generated, in operation 630, the controller 202 may transmit a response to the controller access request to the access control application 211 of the node 201. In this case, the controller 202 may transmit the generated control flow identification information to the access control application 211. In an embodiment, the controller 202 may transmit the accessible application whitelist information to the access control application 211.

In operation 635, the access control application 211 may check the application. For example, the access control application 211 may check the application based on the accessible application whitelist received from the controller 202. The access control application 211 may identify whether the application is present (or installed) in the node 201 based on the accessible application information and may check the integrity and stability of the application present therein (or whether the application is forged or falsified, code signing, or a fingerprint) depending on a validity check policy.

In operation 640, the access control application 211 may transmit an application check result to the controller 202. For example, the access control application 211 may transmit information of the application present therein and the validity check result to the controller 202.

In operation 645, the controller 202 may identify whether a previously accessible access policy is present in the access policy based on the received application information, and when the policy exists, the controller 202 may generate a data flow corresponding to identification information and port information of a destination network which the corresponding application is capable of accessing. Also, the controller 202 may identify whether a data packet is capable of being transmitted through a virtual router based on the node 201 and the generated data flow in a virtual routing policy (e.g., the virtual routing policy database 312 of FIG. 3). When the data packet is capable of being transmitted through the virtual router, the controller 202 may update a virtual routing table and data flow information and may transmit the updated virtual routing table and the updated data flow to the SDN controller 204 (operation 650).

According to an embodiment, when a policy which allows the node 201 to transmit a data packet is absent from the virtual routing policy, the controller 202 may delete the generated data flow.

In operation 655, the controller 202 may transmit the generated data flow to the access control application 211. For example, the data flow may include information about whether a data packet is capable of being transmitted by the virtual router included in the SDN switch.

In operation 660, the access control application 211 may process a result value according to the received response. For example, the access control application 211 may store the received control flow identification information and may display a user interface screen, which indicates that the controller access is completed, to the user. When the controller access is completed, the network access to the destination network, which is requested by the node 201, may be controlled by the controller 202.

According to another embodiment, the controller 202 may determine that the access of the node 201 is impossible. For example, when the identification information of the node 201 and/or the network to which the node 201 belongs is included in a blacklist database, the controller 202 may determine that the access of the node 201 is impossible. In this case, the controller 202 may not generate the control flow in operation 625 and may transmit a response indicating that the controller access is impossible in operation 630. Also, in this case, operation 635 to operation 655 may not be performed. According to an embodiment, when there is a need to retry the controller access, the access control application 211 may again perform operation 605.

Also, when the data flow received from the controller 202 exists, the access control application 211 may update the data flow of the node 201, that is, may manage the data flow such that a data packet is capable of being transmitted based on the data flow previously authorized in the network access.

According to an embodiment, operation 635 to operation 655 may not be performed when it is determined that there is no need for the access control application 211 to check an application.

Figure 7:
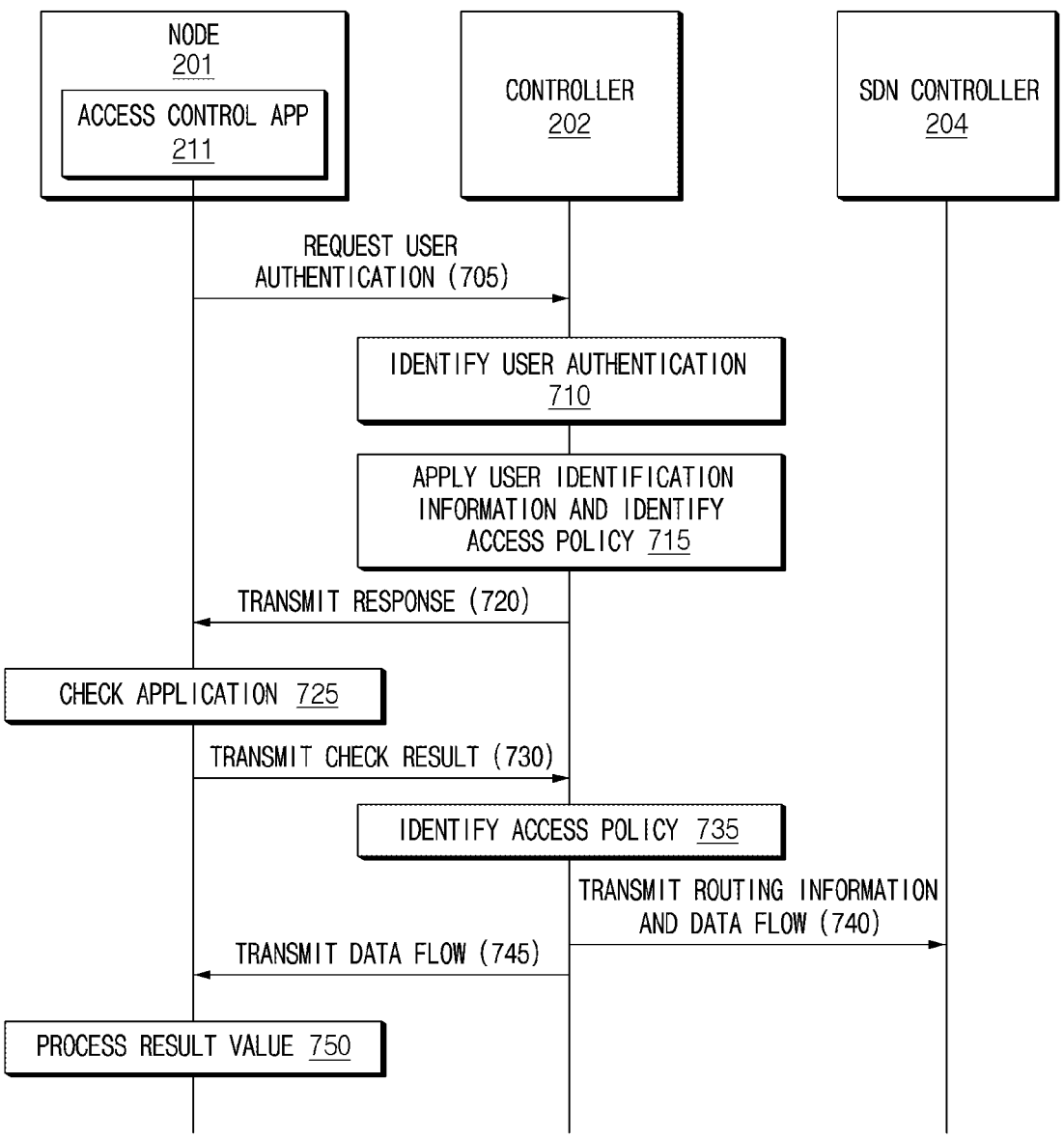
FIG. 7 illustrates a signal flow diagram for user authentication of a node, according to various embodiments.

FIG. 7 illustrates a signal flow diagram for user authentication of a node, according to various embodiments.

For the node 201 to obtain a detailed authority to access a destination network, the access control application 211 of the node 201 may obtain certification for the user of the node 201 from the controller 202.

Referring to FIG. 7, the node 201 may receive an input for user authentication. The input for user authentication may be, for example, a user input for entering a user ID and a password. As another example, the input for user authentication may be a user input (e.g., biometric information) for more enhanced authentication. In this case, in operation 705, the access control application 211 may request user authentication from the controller 202. When the control flow between the node 201 and the controller 202 is already generated, the access control application 211 may transmit the input information for user authentication together with control flow identification information.

In operation 710, the controller 202 may authenticate the user based on the information received from the node 201. For example, the controller 202 may determine whether the user is accessible depending on an access policy and whether the user is included in a blacklist, based on a user ID, a password, and/or enhanced authentication information, which are included in the received information, and a database (e.g., the access policy database 311 or the blacklist database 314 of FIG. 3) included in a memory of the controller 202.

When the user is authenticated, in operation 715, the controller 202 may add identification information (e.g., a user ID) of the user to the control flow identification information. The added user identification information may be used for the authenticated user to access a controller or a network. Also, the controller 202 may generate accessible application information based on the access policy. For example, the accessible application information may be an application whitelist generated based on an access policy.

In operation 720, the controller 202 may transmit information, which indicates that the user is authenticated, to the node 201 as a response to the user authentication request. Also, the controller 202 may transfer the accessible application information to the access control application 211.

In operation 725, the access control application 211 may check the application. For example, the access control application 211 may check the application based on the accessible application whitelist received from the controller 202. The access control application 211 may identify whether the application is present (or installed) in the node 201 based on the accessible application information, and in the case of the existing application, the access control application 211 may check the integrity and stability of the application present therein (or whether the application is forged or falsified, code signing, or a fingerprint) depending on a validity check policy.

In operation 730, the access control application 211 may transmit an application check result to the controller 202. For example, the access control application 211 may transmit information of the application present therein and the validity check result to the controller 202.

In operation 735, the controller 202 may identify whether an access policy accessible in advance is present in the access policy based on the received application information, and when the policy exists, the controller 202 may generate a data flow corresponding to identification information and port information of a destination network which the corresponding application is capable of accessing. Also, the controller 202 may identify whether a data packet is capable of being transmitted through a virtual router based on the node 201 and the generated data flow in a virtual routing policy (e.g., the virtual routing policy database 312 of FIG. 3). When the data packet is capable of being transmitted through the virtual router, the controller 202 may update a virtual routing table and data flow information and may transmit the updated virtual routing table and the updated data flow to the SDN controller 204 (operation 740).

According to an embodiment, when a policy which allows the node 201 to transmit a data packet is absent from the virtual routing policy, the controller 202 may delete the generated data flow.

In operation 745, the controller 202 may transmit the generated data flow to the access control application 211. For example, the data flow may include information about whether a data packet is capable of being transmitted by a virtual router.

In operation 750, the access control application 211 may process a result value according to the received response. For example, the access control application 211 may store the received control flow identification information and may display a user interface screen, which indicates that the user authentication is completed, to the user. When the user authentication is completed, the network access to the destination network, which is requested by the node 201, may be controlled by the controller 202.

According to another embodiment, the controller 202 may determine that user authentication of the node 201 is impossible. For example, when the identification information of the node 201 and/or the network to which the node 201 belongs is included in a blacklist database, the controller 202 may determine that the access of the node 201 is impossible and the user authentication is impossible. In this case, the controller 202 may not apply the user identification information in operation 715 and may transmit a response indicating that the controller access is impossible in operation 720. Also, in this case, operation 725 to operation 745 may not be performed.

Also, when the data flow received from the controller 202 exists, the access control application 211 may update the data flow of the node 201, that is, may manage the data flow such that a data packet is capable of being transmitted based on the data flow previously authorized in the network access.

Figure 8:
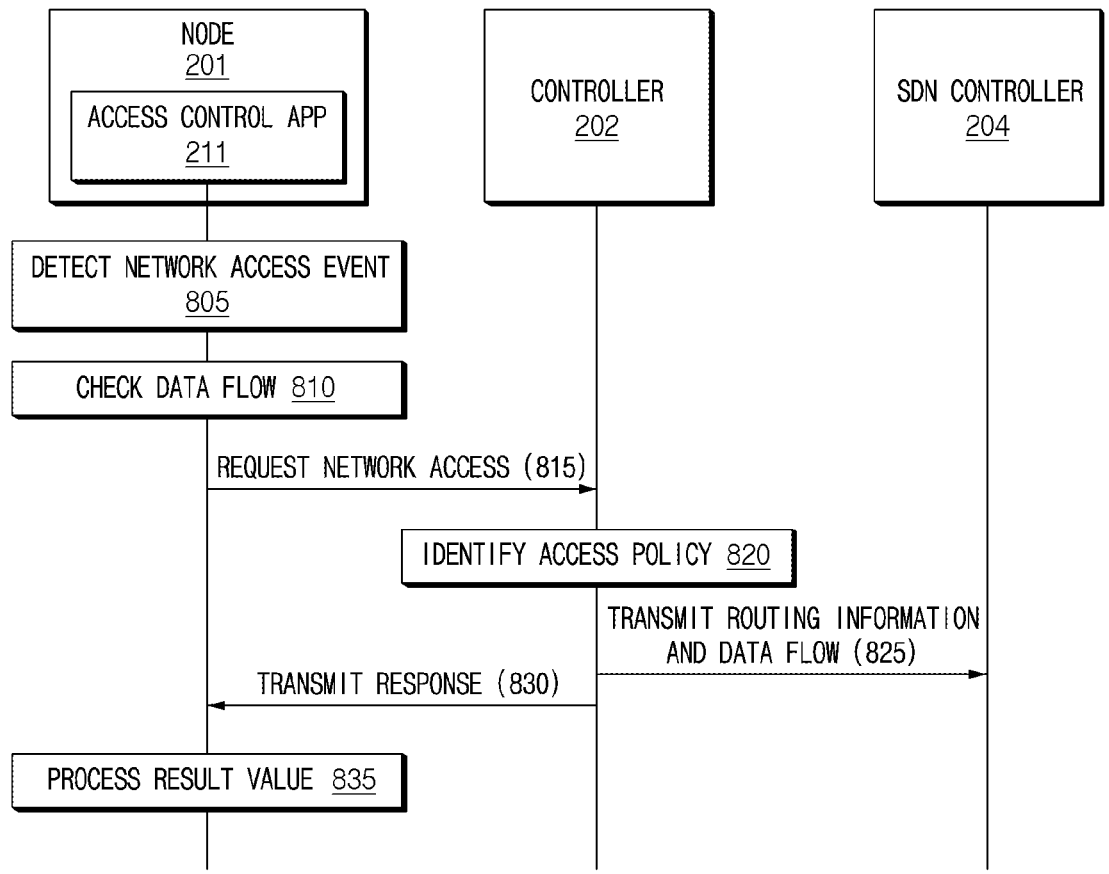
FIG. 8 illustrates a flowchart of a signal for controlling a network access of a node, according to various embodiments.

FIG. 8 illustrates a flowchart of a signal for controlling a network access of a node, according to various embodiments.

After the node 201 is authorized from the controller 202, the node 201 may control a network access of any other applications stored in the node 201 through the access control application 211 of the node 201, and thus, trusted data transmission may be guaranteed.

In operation 805, the access control application 211 may detect a network access event of another application (e.g., the target application 221 of FIG. 2) stored in the node 201.

In operation 810, the access control application 211 may identify whether there exists a data flow corresponding to identification information of an application requesting the network access, and destination network identification information and port information. According to an embodiment, when the data flow exists but is invalid, the access control application 211 may drop a data packet. According to another embodiment, when the data flow exists, the access control application 211 may transmit the data packet based on the data flow.

When the data flow does not exist or when the data flow should be updated, for example, when there is a need to update the data flow as an authentication time expires, in operation 815, the access control application 211 may request the network access from the controller 202. For example, the network access request may include control flow identification information, and identification information and port information of the destination network.

In operation 820, the controller 202 may identify whether access-requested identification information (e.g., identification information and port information of a destination network) is included and whether the access to the destination network is possible, in an access policy corresponding to information (e.g., a node, a user, and destination network identification information) identified based on the control flow identification information. According to an embodiment, when the network access is impossible, the controller 202 may transmit an access-impossible result to the access control application 211 of the node 201 (operation 830).

When the network access request received from the access control application 211 is an access request from an application dangerous in terms of the access policy or when the access of the node 201 has to be immediately blocked due to an abnormal access attempt, the controller 202 may request the SDN controller 204 to remove a routing table allocated to the node other than a default routing table allowable by a virtual routing policy (e.g., the virtual routing policy database 312 of FIG. 3) (operation 825). The SDN controller 204 may remove the routing table based on the received routing table removal information and may control a virtual router included in an SDN switch so as not to perform routing to the removed routing path. In another embodiment, when it is determined that the network access is possible, the controller 202 may not perform operation 825.

When the access is possible, the controller 202 may identify whether a data flow corresponding to the identification information and port information of the destination network exists. When the data flow does not exist, the controller 202 may generate a data flow corresponding to the identification information and port information of the destination network which the application requesting the access is capable of accessing. Also, the controller 202 may identify whether a data packet is capable of being transmitted through a virtual router based on the node 201 and the generated data flow in a virtual routing policy (e.g., the virtual routing policy 312 of FIG. 3). When the data packet is capable of being transmitted through the virtual router, the controller 202 may update a virtual routing table and data flow information and may transmit the updated virtual routing table and the updated data flow to the SDN controller 204 (operation 825). In another embodiment, when a data flow corresponding to the identification information and port information of the destination network exists, the controller 202 may transmit the data flow to the access control application 211 (operation 830).

In operation 835, the access control application 211 of the node 201 may process a result value for the response received from the controller 202. For example, when the access control application 211 receives a network access-impossible result from the controller 202, the access control application 211 may drop a data packet which the application intends to transmit. For another example, when the data flow is received from the controller 202, the access control application 211 may transmit a data packet based on the received data flow.

In an embodiment, after execution of operation 810, the access control application 211 may perform a validity check for an access application depending on a validity check policy. For example, the access control application 211 may further check the integrity and stability of the access application (e.g., whether the application is forged or falsified, code signing, a fingerprint, or the like). When a validity check result indicates a success, the access control application 211 may perform operation 815.

Figure 9:
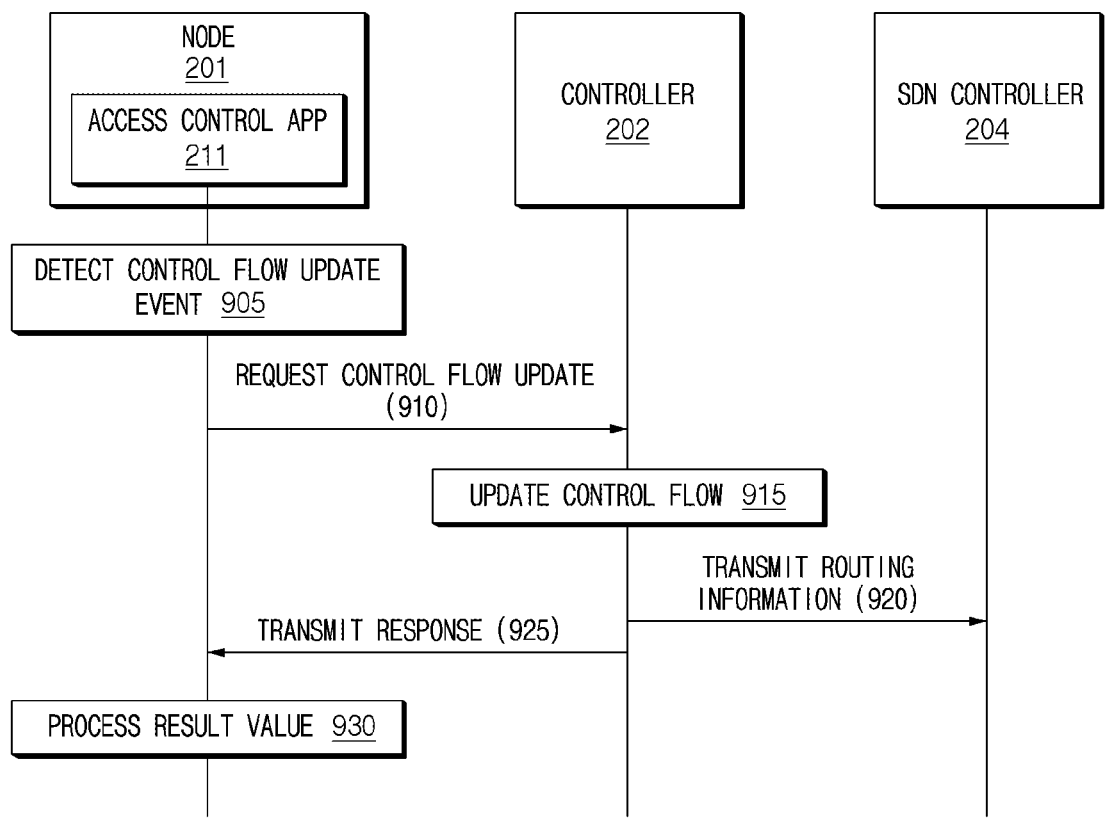
FIG. 9 illustrates a signal flow diagram for updating a control flow of a node, according to various embodiments.

FIG. 9 illustrates a signal flow diagram for updating a control flow of a node, according to various embodiments.

The access control application 211 may maintain information about a control flow and a data flow of the node 201 and may periodically request the update of the control flow to receive an updated data flow from the controller 202 or to identify whether the control flow is valid.

Referring to FIG. 9, in operation 905, the access control application 211 may detect a control flow update event.

In operation 910, the access control application 211 may request the controller 202 to update the control flow based on control flow identification information.

In operation 915, the controller 202 may identify whether the control flow is present in a control flow table (e.g., the control flow table 316 of FIG. 3) based on the received control flow identification information. According to an embodiment, when the control flow does not exist (e.g., when the access is released by another security system or when the access is released by internal risk detection or the like), because the access of the node 201 is invalid, the controller 202 may transmit an access-impossible result to the access control application 211 (operation 925). In another embodiment, when the access of the node 201 should be blocked, the controller 202 may request the SDN controller 204 to remove a routing table allocated to a node other than a default routing table allowable by a virtual routing policy (e.g., the virtual routing policy 312 of FIG. 3) (operation 920).

When the control flow is present in the control flow table (e.g., the control flow table 316 of FIG. 3), the controller 202 may update an update time. In this case, the controller 202 may transmit identification information of the updated control flow to the access control application 211 (operation 925).

In an embodiment, when there exists a data flow, which should again be authenticated or through which the access is impossible anymore, from among data flows depending on the identified control flow, the controller 202 may transmit information about the corresponding data flow to the access control application 211 (operation 925).

In operation 930, the access control application 211 of the node 201 may process a result value for the response received from the controller 202. For example, when a control flow update result is impossible, the access control application 211 may block all the network accesses of the application. For another example, when a control flow update result is normal and updated data flow information exists, the access control application 211 may update the data flow.

Figure 10:
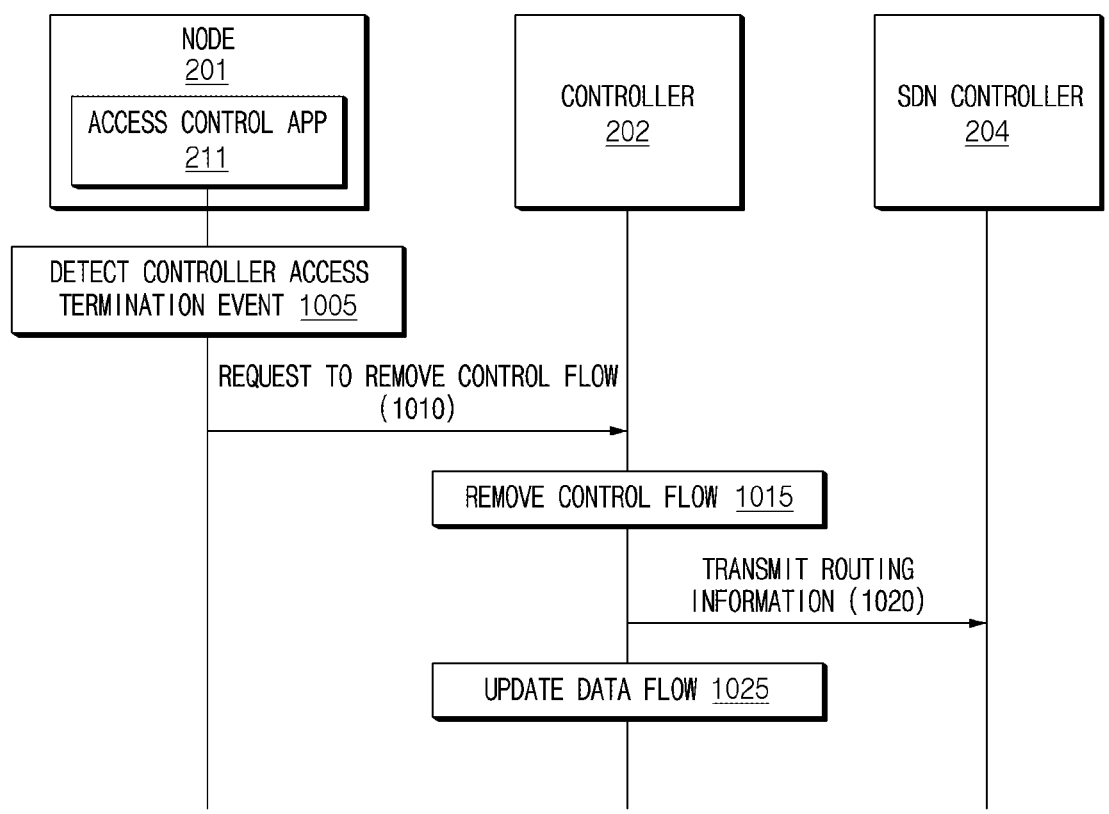
FIG. 10 illustrates a signal flow diagram for controller access termination of a node, according to various embodiments.

FIG. 10 illustrates a signal flow diagram for controller access termination of a node, according to various embodiments.

Referring to FIG. 10, in operation 1005, the node 201 may detect that the node 201 is terminated or that the access control application 211 is terminated. In this case, in operation 1010, the node 201 or the access control application 211 may request the controller 202 to remove a control flow.

In operation 1015, the controller 202 may remove a control flow identified based on received control flow identification information. Also, the controller 202 may request the SDN controller 204 to remove a routing table allocated to the node 201 other than a default routing table allowable by a virtual routing policy (operation 1020).

In operation 1025, the controller 202 may remove all the data flows dependent on the removed control flow. Accordingly, the node 201 may no longer access a destination network based on the removed data flow.

Figure 11:
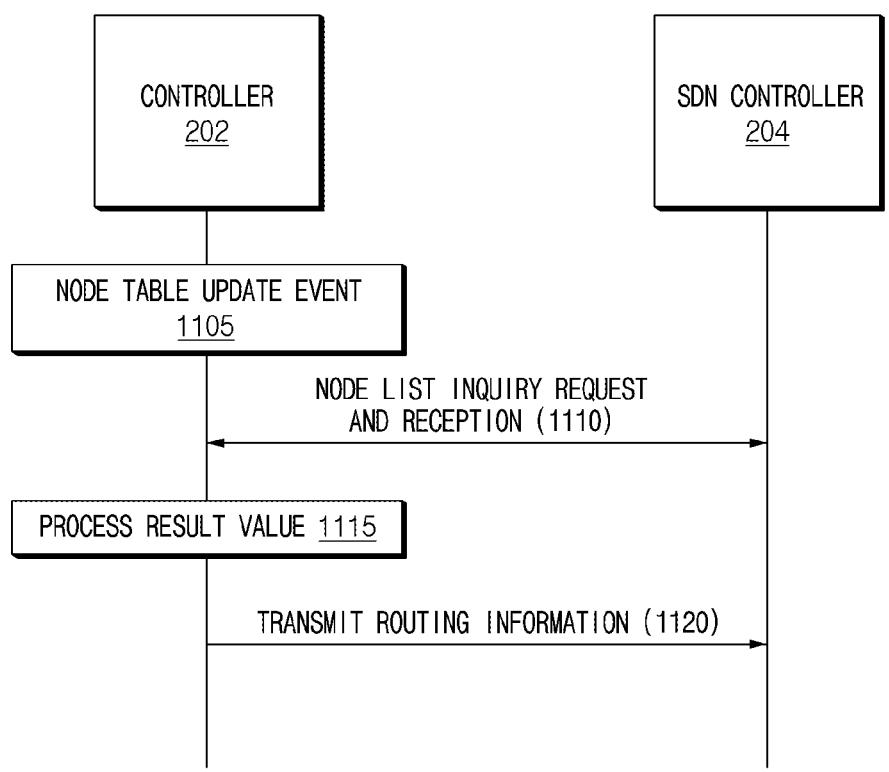
FIG. 11 illustrates a signal flow diagram for updating an SDN access node table, according to various embodiments.

FIG. 11 illustrates a signal flow diagram for updating an SDN access node table, according to various embodiments.

The controller 202 may manage a list of provisioning nodes by updating an SDN access node table (e.g., the SDN access node table 319 of FIG. 3) periodically.

Referring to FIG. 11, in operation 1105, the controller 202 may detect an SDN access node table update event. In this case, the controller 202 may determine an SDN controller, which will update a list of nodes connected to an SDN switch, in an SDN controller table.

In operation 1110, the controller 202 may transmit a node list inquiry request to the determined SDN controller 204. For example, the SDN controller 204 may transmit a list of nodes currently connected to an SDN switch to the controller 202.

In operation 1115, the controller 202 may process a result value for the received node list. For example, the controller 202 may update an SDN access node table based on the node list received from the SDN controller 204. According to an embodiment, when a node is removed at the time of updating the SDN access node table, the controller 202 may remove a control flow generated to correspond to the removed node and may request the SDN controller 204 to remove a routing table allocated to the removed node other than a default routing table allowable by a virtual routing policy (operation 1120).

According to another embodiment, when a node is present in the SDN access node table but the control flow generated to correspond to the corresponding node does not exist, the controller 202 may identify an SDN controller policy (e.g., the SDN policy 315 of FIG. 3); when the corresponding node exceeds a control flow generation time and when the use of the node should be limited, the controller 202 may request the SDN controller 204 to remove a routing table allocated to the removed node other than a default routing table allowable by a virtual routing policy (operation 1120).

Figure 12:
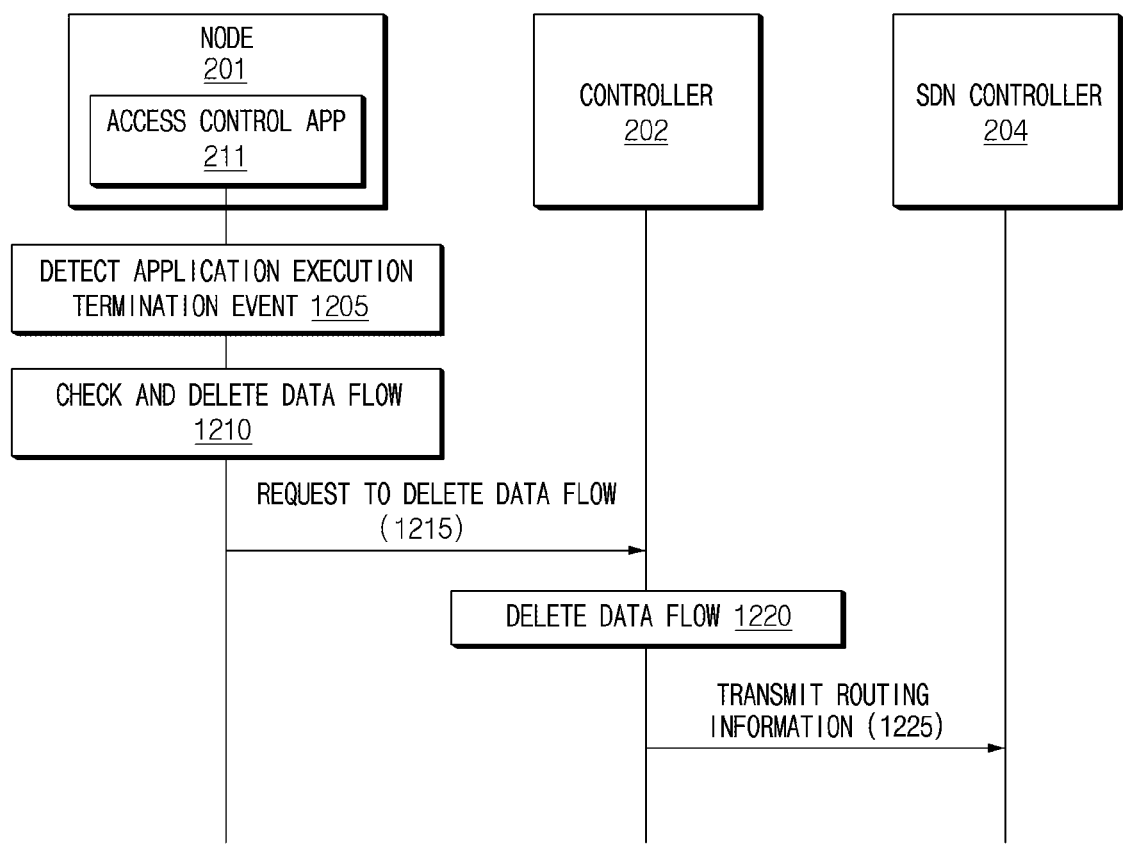
FIG. 12 illustrates a signal flow diagram for application execution termination of a node, according to various embodiments.

FIG. 12 illustrates a signal flow diagram for application execution termination of a node, according to various embodiments.

Referring to FIG. 12, in operation 1205, the access control application 211 of the node 201 may identify whether an application under execution is terminated in real time and may detect an application execution termination event.

In operation 1210, the access control application 211 may identify whether a data flow corresponding to identification information of the terminated application and process ID and child process ID tree (PID) information exist. When the data flow exists, the access control application may delete the corresponding data flow. According to an embodiment, to track the termination of an application executable in multiple, the access control application 211 may identify the terminated application is present in a list of processed under execution, and when the terminated application does not exist, the access control application 211 may delete the entire data flow corresponding to identification information of the terminated application.

In operation 1215, the access control application 211 may transmit a delete request for the deleted data flow to the controller 202.

In operation 1220, the controller 202 may delete the delete-requested data flow. Also, when an access path (e.g., routing) which need be no longer routed depending on the deleted data flow is present in a routing table, the controller 202 may delete the corresponding routing table and may transmit the deleted routing table to the SDN controller 204 (operation 1225). Accordingly, a data packet corresponding to the source network, destination network, and port information included in the removed data flow fail to be transmitted no longer.

Figure 13:
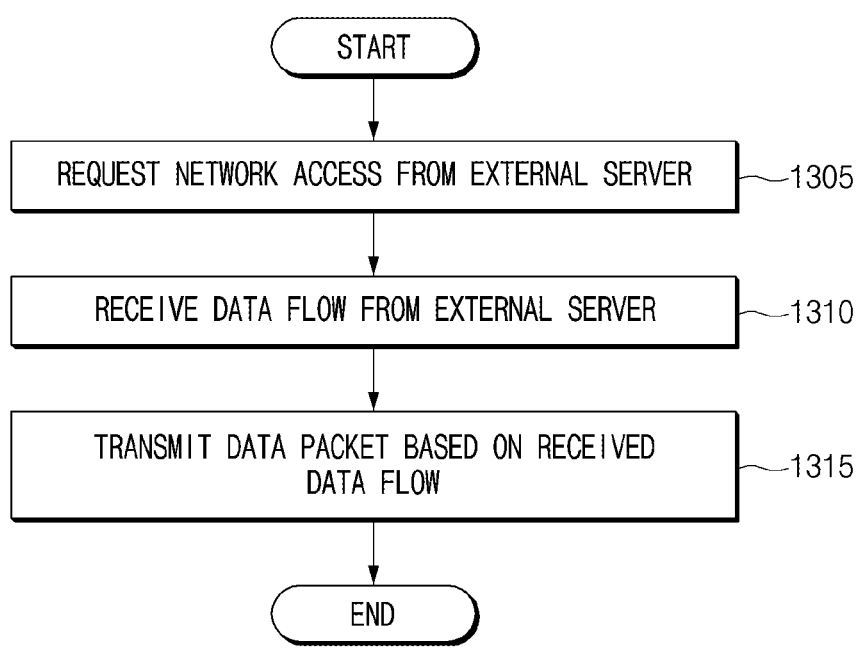
FIG. 13 is a flowchart illustrating operations for a network access request of a node, according to various embodiments.

FIG. 13 is a flowchart illustrating operations for a network access request of a node, according to various embodiments. Operations illustrated in FIG. 13 may be performed by the access control application 211 of the node 201 of FIG. 2.

Referring to FIG. 13, in operation 1305, the access control application 211 may request a network access from an external server. For example, the external server may be the controller 202, and the network access request may include control flow identification information, and identification information and port information of a destination network.

In operation 1310, the access control application 211 may receive a data flow from the external server. For example, the external server may be the controller 202, and the received data flow may correspond to identification information of the node 201, and the identification information and port information of the destination network. Also, the received data flow may include information about whether a data packet is capable of being transmitted through a virtual router. According to an embodiment, the information about whether the data packet is capable of being transmitted through the virtual router may include a routing table.

In operation 1315, the access control application 211 may transmit a data packet based on the received data flow. For example, the access control application 211 may transmit the data packet through the virtual router included in the received data flow. That is, the access control application 211 may transmit a data packet of a target application to a virtual router included in an SDN switch.

Figure 14:
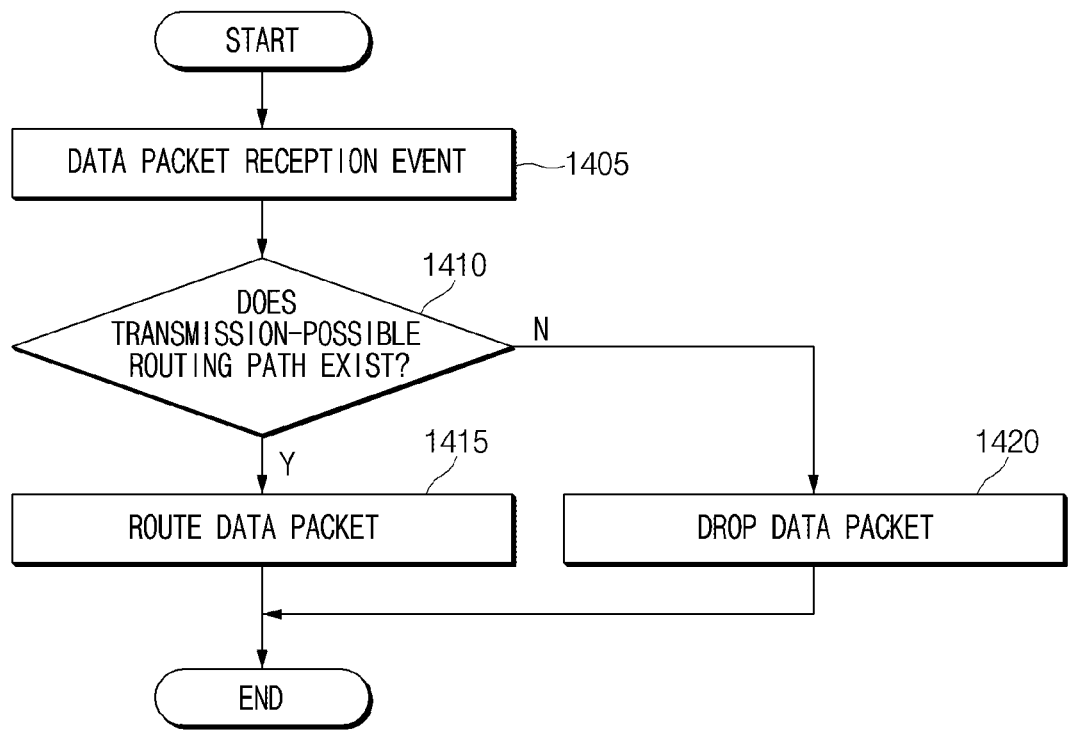
FIG. 14 is a flowchart illustrating operations for controlling a data packet at a virtual router, according to various embodiments.

FIG. 14 is a flowchart illustrating operations for controlling a data packet at a virtual router, according to various embodiments. In an embodiment, operations illustrated in FIG. 14 may be performed through the virtual router 213 included in the SDN switch 203 of FIG. 2.

Referring to FIG. 14, in operation 1405, the virtual router 213 may detect a data packet reception event. For example, the virtual router 213 may receive a multicasted data packet present in a segment such as a node.

In operation 1410, the virtual router 213 identifies whether a routing path capable of transmitting a data packet exists. For example, the virtual router 213 identifies a source network band and a destination network band are present in a routing table, based on source network identification information and destination network identification information included in 5 Tuple information of an IP of the data packet. According to an embodiment, when a transmission-possible path (or routing) is present in the routing table, the virtual router 213 may route the data packet (operation 1415). In another embodiment, when a transmission-possible path (or routing) is absent from the routing table, the virtual router 213 may drop the data packet (operation 1420).

The above description is merely an illustrative explanation of the technical idea disclosed in the present disclosure, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of protection of the technical idea disclosed in the present disclosure should be interpreted in accordance with the claims below, and all the technical ideas within the scope equivalent to the claims should be included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A node, comprising:
a communication circuit;
a processor operatively connected to the communication circuit; and
a memory operatively connected to the processor, and configured to store an access control application and a target application, wherein the memory stores instructions, when executed by the processor, causing the node to:
perform a network access request to an external server through the access control application, wherein the network access request includes control flow identification information, identification information of the target application and identification information and port information of a destination network;
receive a data flow from the external server through the access control application, wherein the data flow corresponds to the network access request and the data flow includes information about whether a data packet of the target application is capable of being transmitted to the destination network through a virtual router; and
transmit the data packet of the target application to the destination network based on the received data flow, through the access control application, wherein the virtual router is included in a software defined network (SDN) switch through which the node transmits the data packet to the destination network, and wherein the transmitting of the data packet to the destination network is only possible when the data flow generated by the external server exists in the access control application.

2. The node of claim 1, wherein the instructions cause the node to:
perform a controller access request to the external server through the access control application, wherein the controller access request includes information about the node;
receive a first response to the control access request from the external server through the access control application, wherein the first response includes identification information of a control flow generated between the access control application and the external server and an accessible application list;
check an application included in the node based on the accessible application list through the access control application and transmit the check result to the external server; and
receive an updated data flow from the external server through the access control application, wherein the updated data flow includes information about whether data packet transmission by the virtual router is possible.

3. The node of claim 1, wherein the instructions cause the node to:
perform a user authentication request to the external server through the access control application;
receive a second response to the user authentication request from the external server through the access control application, wherein the second response includes identification information of a control flow generated between the access control application and the external server and an accessible application list;
check an application included in the node based on the accessible application list through the access control application;
transmit the check result to the external server through the access control application; and
receive an updated data flow from the external server through the access control application, wherein the updated data flow includes information about whether data packet transmission by the virtual router is possible.

4. The node of claim 1, wherein the instructions cause the node to:
detect a network access event through the access control application;
identify whether there exists the data flow corresponding to identification information of the target application and the destination network through the access control application;
when the data flow exists, identify whether transmission of a data packet to the virtual router is possible based on the data flow; and
when the transmission of the data packet to the virtual router is possible, transmit the data packet of the target application through the SDN switch including the virtual router based on the data flow.

5. The node of claim 1, wherein the instructions cause the node to:
detect a network access event that the target application accesses the destination network through the access control application;
identify whether the data flow exists, through the access control application; and
when the data flow does not exist, perform the network access request including control flow identification information to the external server through the access control application.

6. The node of claim 1, wherein the instructions cause the node to:
perform a control flow update request to the external server through the access control application, wherein the control flow update request includes control flow identification information;
receive an updated control flow or a result, which indicates that an update of the control flow is impossible, from the external server through the access control application; and
when the result indicating the update of the control flow is impossible is received, blocks all network accesses through the access control application.

7. The node of claim 1, wherein the instructions cause the node to:
detect an application execution termination event through the access control application;
identify the data flow corresponding to the terminated application through the access control application and remove the corresponding data flow; and
perform a data flow delete request to the external server through the access control application, wherein the data flow delete request includes information about the removed data flow.

8. A server, comprising:
a communication circuit;
a memory configured to store a database; and
a processor operatively connected to the communication circuit and the memory, wherein the processor is configured to:
receive a network access request from an access control application of a node, wherein the network access request includes control flow identification information, identification information of a target application of the node, and identification information and port information of a destination network;
identify whether an access of the target application is possible, based on the identification information of the target application, the identification information of the destination network, and the port information;
in response to identifying that the access of the target application is possible, generate a data flow;
identify whether a data packet of the target application is capable of being transmitted to the destination network through a virtual router;
in response to identifying that the data packet is capable of being transmitted through the virtual router, update the data flow, wherein the virtual router is included in an SDN switch between the node and the destination network; and
transmit the updated data flow to the access control application of the node and an SDN controller connected to the SDN switch, wherein the transmitting of the data packet to the destination network is only possible when the data flow generated by the server exists in the access control application.

9. The server of claim 8, wherein the processor is configured to:
identify whether there is a need to block an access of the node; and
when there is a need to block the access of the node, request the SDN controller to remove remaining routing bands other than a virtual routing band basically to be allowed.

10. The server of claim 8, wherein the processor is configured to:
receive a controller access request from the access control application of the node, wherein the controller access request includes identification information of the node;
identify whether the node is in an accessible state based on the database;
identify whether the node is present in the database based on the identification information of the node;
when the node is present in the database, generate a control flow and generate an accessible application list based on the database; and
transmit identification information of the generated control flow and the accessible application list to the node.

11. The server of claim 10, wherein the processor is configured to:
when the node is absent from the database, request a node list from the SDN controller;
receive a list of nodes currently connected to an SDN switch from the SDN controller; and
identify whether the node exists based on the list of the nodes connected to the SDN switch.

12. The server of claim 8, wherein the processor is configured to:
receive a control flow update request from the access control application of the node, wherein the control flow update request includes the control flow identification information;
identify whether the control flow identification information is included in the database;
when the control flow identification information is included in the database, update the control flow and transmit the updated control flow to the node; and
when the control flow identification information is not included in the database, request the SDN controller to delete a routing band allocated to the node and transmit a control flow update failure result to the node.

13. The server of claim 8, wherein the processor is configured to:
request node list inquiry from the SDN controller;
update the database based on a node list received from the SDN controller; and
request the SDN controller to delete a routing band allocated to a node removed from the database.

14. An operating method of an access control application installed in a node, the method comprising:
performing a network access request to an external server through the access control application, wherein the network access request includes control flow identification information, identification information of a target application installed in the node and identification information and port information of a destination network;
receiving a data flow from the external server through the access control application, wherein the data flow corresponds to the access request including the identification information of the target application of the node and the identification information of the destination network and the data flow includes information about whether a data packet of the target application is capable of being transmitted to the destination network through a virtual router; and
transmitting the data packet of the target application to the destination network based on the received data flow, through the access control application, wherein the virtual router is included in an SDN switch through which the node transmits the data packet to the destination network, and wherein the transmitting of the data packet to the destination network is only possible when the data flow generated by the external server exists in the access control application.

15. The method of claim 14 comprising:

performing a controller access request to the external server through the access control application, wherein the controller access request includes information about the node;

receiving a first response to the control access request from the external server through the access control application, wherein the first response includes identification information of a control flow generated between the access control application and the external server and an accessible application list;

checking an application included in the node based on the accessible application list through the access control application and transmit the check result to the external server; and receiving an updated data flow from the external server through the access control application, wherein the updated data flow includes information about whether data packet transmission by the virtual router is possible.

16. The method of claim 14 comprising:

performing a user authentication request to the external server through the access control application;

receiving a second response to the user authentication request from the external server through the access control application, wherein the second response includes identification information of a control flow generated between the access control application and the external server and an accessible application list;

checking an application included in the node based on the accessible application list through the access control application;

transmitting the check result to the external server through the access control application; and receiving an updated data flow from the external server through the access control application, wherein the updated data flow includes information about whether data packet transmission by the virtual router is possible.

17. The method of claim 14 comprising:

detecting a network access event through the access control application;

identifying whether there exists the data flow corresponding to identification information of the target application and the destination network through the access control application;

when the data flow exists, identifying whether transmission of a data packet to the virtual router is possible based on the data flow; and when the transmission of the data packet to the virtual router is possible, transmitting the data packet of the target application through the SDN switch including the virtual router based on the data flow.

18. The method of claim 14 comprising:

detecting a network access event that the target application accesses the destination network through the access control application;

identifying whether the data flow exists, through the access control application; and when the data flow does not exist, performing the network access request including control flow identification information to the external server through the access control application.

19. The method of claim 14 comprising:

performing a control flow update request to the external server through the access control application, wherein the control flow update request includes control flow identification information;

receiving an updated control flow or a result, which indicates that an update of the control flow is impossible, from the external server through the access control application; and when the result indicating the update of the control flow is impossible is received, blocking all network accesses through the access control application.

20. The method of claim 14 comprising:

detecting an application execution termination event through the access control application;

identifying the data flow corresponding to the terminated application through the access control application and remove the corresponding data flow; and performing a data flow delete request to the external server through the access control application, wherein the data flow delete request includes information about the removed data flow.

* * * * *